United States Patent
Usami

(10) Patent No.: US 10,128,687 B2
(45) Date of Patent: Nov. 13, 2018

(54) POWER TRANSMISSION APPARATUS, AND POWER TRANSMITTING DEVICE AND POWER RECEIVING DEVICE FOR THE POWER TRANSMISSION APPARATUS

(71) Applicant: TOSHIBA TEC KABUSHIKI KAISHA, Shinagawa-ku, Tokyo (JP)

(72) Inventor: Yutaka Usami, Izunokuni (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 985 days.

(21) Appl. No.: 14/328,859

(22) Filed: Jul. 11, 2014

(65) Prior Publication Data

US 2015/0015081 A1    Jan. 15, 2015

(30) Foreign Application Priority Data

Jul. 12, 2013   (JP) .................................. 2013-146320

(51) Int. Cl.
*H02J 50/12* (2016.01)
*H04B 5/00* (2006.01)
(Continued)

(52) U.S. Cl.
CPC ............ *H02J 50/12* (2016.02); *H04B 5/0037* (2013.01); *H04B 5/0093* (2013.01); *H02J 5/005* (2013.01);
(Continued)

(58) Field of Classification Search
CPC ..................................................... H02J 50/12
See application file for complete search history.

(56) References Cited

U.S. PATENT DOCUMENTS

2005/0035726 A1   2/2005   Muramatsu et al.
2010/0263643 A1   10/2010  Agneray et al.
(Continued)

FOREIGN PATENT DOCUMENTS

JP           2011-503417         1/2011
JP    WO 2011142417 A1 *    11/2011    .............. H02J 5/005
(Continued)

OTHER PUBLICATIONS

Amos et al., Newnes Dictionary of Electronics, 1999, 4th Edition, pp. 227,289.*

(Continued)

*Primary Examiner* — Daniel Cavallari
(74) *Attorney, Agent, or Firm* — Amin, Turocy & Watson LLP

(57) ABSTRACT

There is provided a non-contact power transmission apparatus which can supply stable power from a power transmitting side to a power receiving side even if a load is changed. The power transmission apparatus transmits power from a power transmitting device to a power receiving device in a non-contact manner. The power transmitting device includes a series circuit which is connected to a direct-current power source, and includes a parallel resonance circuit including a first capacitor and a first inductor, and a switch element, a drive source to drive on or off the switch element, and a first series resonance circuit connected to a connection point between the parallel resonance circuit and the switch element and including a second inductor, a second capacitor and a power transmission coil. The power receiving device includes a second series resonance circuit including a power receiving coil paired with the power transmission coil and a third capacitor connected in series to the power receiving coil, and a rectifying circuit to rectify a (Continued)

voltage generated in the second series resonance circuit and to supply the voltage to a load circuit.

9 Claims, 5 Drawing Sheets

(51) Int. Cl.
*H02J 5/00* (2016.01)
*H02M 3/335* (2006.01)

(52) U.S. Cl.
CPC ...... *H02M 3/33523* (2013.01); *Y02B 70/1433* (2013.01)

(56) References Cited

U.S. PATENT DOCUMENTS

| | | |
|---|---|---|
| 2012/0235636 A1 | 9/2012 | Partovi |
| 2013/0033118 A1* | 2/2013 | Karalis ............... H01F 38/14 307/104 |
| 2013/0093390 A1 | 4/2013 | Partovi |
| 2013/0119927 A1 | 5/2013 | Partovi |
| 2013/0119928 A1 | 5/2013 | Partovi |
| 2013/0119929 A1 | 5/2013 | Partovi |
| 2013/0127257 A1 | 5/2013 | Yamamoto et al. |
| 2013/0193913 A1* | 8/2013 | Takada ............... H02J 5/005 320/108 |
| 2015/0214788 A1* | 7/2015 | Hosotani ............ H02J 17/00 307/104 |
| 2015/0357826 A1* | 12/2015 | Yoo .................... H02J 5/005 307/104 |

FOREIGN PATENT DOCUMENTS

| | | |
|---|---|---|
| JP | 2013-076936 | 4/2015 |
| WO | 2009-070730 | 6/2009 |

OTHER PUBLICATIONS

Office Action for Japanese Patent Application No. 2013-146320 dated Jun. 9, 2015, 4 pages.

* cited by examiner (a)
| DRIVE FREQUENCY = f0 (Hz) |
|---|
| FIRST RESONANCE FREQUENCY <br> $f1 = \dfrac{1}{2\pi\sqrt{L1 \cdot C1}}$   ⇒ 1.1 TO 1.2 TIMES f0 <br><br> SECOND RESONANCE FREQUENCY <br> $f2 = \dfrac{1}{2\pi\sqrt{(L2+T1) \cdot C2}}$   ⇒ 0.8 TO 0.9 TIMES f0 |

(b)
| THIRD RESONANCE FREQUENCY <br> $f3 = \dfrac{1}{2\pi\sqrt{T2 \cdot C3}}$   ⇒ 0.9 TO 1.0 TIMES f0 |
|---|

POWER TRANSMISSION APPARATUS, AND POWER TRANSMITTING DEVICE AND POWER RECEIVING DEVICE FOR THE POWER TRANSMISSION APPARATUS

CROSS-REFERENCE TO RELATED APPLICATION

This application is based upon and claims the benefit of priority from Japanese Patent Application No. 2013-146320, filed Jul. 12, 2013, the entire contents of which are incorporated herein by reference.

FIELD

Embodiments described herein relate generally to a power transmission apparatus for transmitting power from a power transmitting device to a power receiving device in a non-contact manner, and to the power transmitting device and the power receiving device for the power transmission apparatus.

BACKGROUND

In recent years, an apparatus for transmitting power in a non-contact manner becomes popular. The power transmission apparatus includes a power transmitting device for transmitting power and a power receiving device for receiving the transmitted power, and transmits the power from the power transmitting device to the power receiving device in a non-contact manner.

The non-contact power transmission apparatus has a structure in which a primary coil of a transformer is placed on the power transmitting device side, and a secondary coil of the transformer is placed on the power receiving device side, and the power transmitting device and the power receiving device are required to be placed as closely as possible to each other. Thus, although power transmission in a non-contact manner can be performed, convenience is not much improved.

Besides, recently, a power transmission apparatus of a magnetic field resonance system is also known. In the magnetic field resonance system, power can be transmitted by combination of a resonant element (also called a resonance element) provided in a power transmitting device and including a coil and a capacitor, and a resonant element provided in a power receiving device and including a coil and a capacitor. The power receiving device includes a drive circuit to drive its own equipment, and a load circuit such as a charger of a secondary battery. In the magnetic field resonance system, when an equipment is placed on a charging stand, positioning is not severely required.

In power transmission to which the magnetic field resonance is applied, a one-piece voltage resonance type inverter is conceivable to be adopted as a structure in which power is transmitted by a relatively simple structure and which is suitable for a small equipment. As an example in which the one-piece voltage resonance is applied, there is an inverter apparatus to light a discharge lamp (see, for example, FIG. 8 of Patent Literature 1).

However, in the one-piece voltage resonance type, although the structure is simple, plural resonant systems exist in a circuit, and there is a problem that the resonant mode changes by load variation or the like, and the operation becomes unstable.

Patent Literature 1: JP-A-10-41081

DETAILED DESCRIPTION

Figure 1:
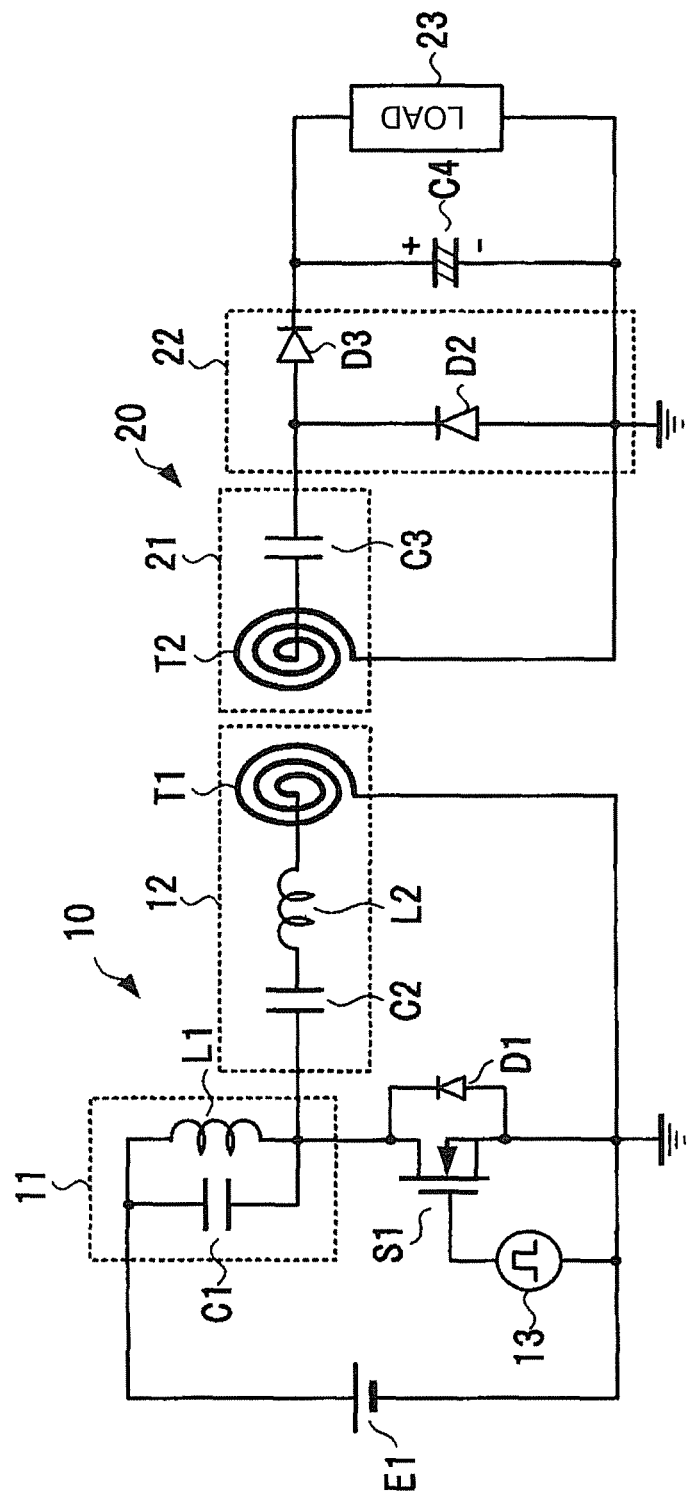
FIG. 1 is a circuit view showing a whole structure of a power transmission apparatus of an embodiment.

Exemplary embodiments described herein provide a non-contact power transmission apparatus which can supply stable power from a power transmitting side to a power receiving side even if a load is changed.

In general, according to one embodiment, a power transmission apparatus transmits power from a power transmitting device to a power receiving device in a non-contact manner. The power transmitting device includes a series circuit which is connected between a direct-current power source and a reference potential point, and includes a parallel resonance circuit including a first capacitor and a first inductor, and a switch element including a parasitic diode in parallel to a main current path, a drive source to drive on or off the switch element, and a first series resonance circuit connected to a connection point between the parallel resonance circuit and the switch element and including a second inductor, a second capacitor and a power transmission coil. The power receiving device includes a second series resonance circuit including a power receiving coil paired with the power transmission coil and a third capacitor connected in series to the power receiving coil, and a rectifying circuit to rectify a voltage generated in the second series resonance circuit and to supply the voltage to a load circuit.

Hereinafter, embodiments to carry out the invention will be described with reference to the drawings. Incidentally, the same portions in the respective drawings are denoted by the same reference numerals.

First Embodiment

FIG. 1 is a circuit view showing a whole structure of a power transmission apparatus of a first embodiment. The power transmission apparatus of FIG. 1 includes a power transmitting device 10 and a power receiving device 20. The power transmitting device 10 includes a direct-current power source E1, a first resonance circuit 11 (parallel resonance circuit) including a first capacitor C1 and a first inductor L1, and a semiconductor switch S1 as a switch element. The first resonance circuit 11 and the semiconductor switch S1 are connected in series between a power supply terminal of the direct-current power source E1 and a reference potential point (earth).

The semiconductor switch S1 is, for example, an N-type MOSFET and is a half-wave switch including a parasitic diode D1 (also called a body diode) in parallel to a main current path (drain-source current path). Incidentally, in the following description, the semiconductor switch S1 as the switch element is simply called the switch S1, and the parasitic diode D1 is simply called the diode D1.

The cathode of the diode D1 is connected to the drain of the switch S1, and the anode of the diode D1 is connected to the source of the switch S1. A drive source 13 to drive on or off the switch S1 is connected to the gate of the semiconductor switch S1, and the drive source 13 supplies a drive pulse to the gate of the switch S1. As the drive source 13, an oscillator, such as a crystal oscillator, to generate a drive pulse having a stable frequency is used.

A second resonance circuit (series resonance circuit) including a second capacitor C2, a second inductor L2 and a power transmission coil T1 is connected to a connection point between the first resonance circuit 11 and the switch S1. One end of the power transmission coil T1 is connected to the second inductor L2, and the other end is connected to the reference potential point.

On the other hand, the power receiving device 20 includes a third resonance circuit 21 (series resonance circuit) including a power receiving coil T2 and a third capacitor C3. One end of the power receiving coil T2 is connected to the third capacitor C3, and the other end is connected to the reference potential point. A rectifying circuit 22 including diodes D2 and D3 is connected to the third resonance circuit 21. A fourth capacitor C4 for smoothing is connected to the output end of the rectifying circuit 22. Besides, a load circuit 23 is connected to both ends of the smoothing capacitor C4.

Figures 2, 3:
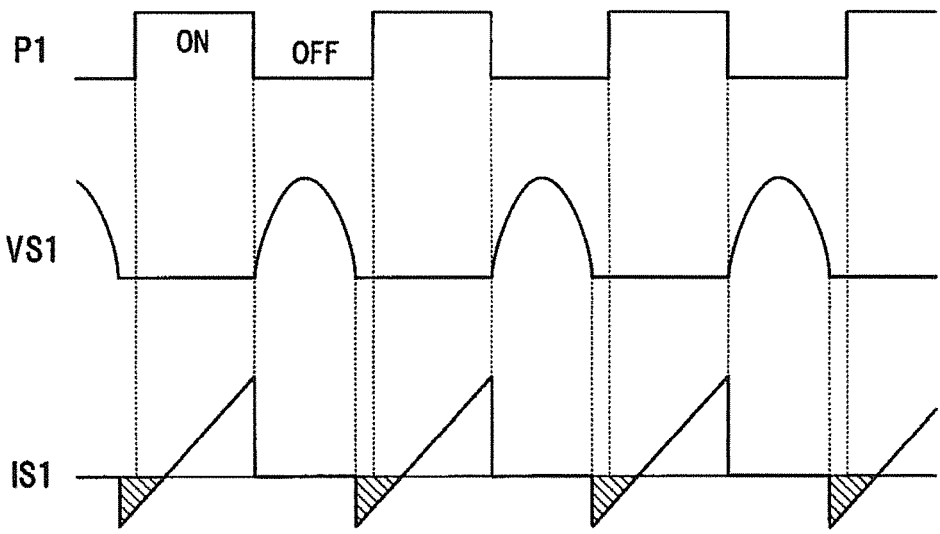
FIG. 2 is a signal waveform view showing a basic operation of a power transmitting device in the embodiment.
FIG. 3 shows explanatory views for explaining constants of respective elements of the power transmission apparatus in the embodiment and a second embodiment.

FIG. 2 is a signal waveform view showing a basic operation of the power transmitting device 10 of FIG. 1, and shows a drive pulse P1 of the drive source 13, an output voltage VS1 of the switch S1, and a current IS1 flowing through the main current path of the switch S1. The operation of the power transmitting device 10 of FIG. 1 will be described with reference to FIG. 2.

In FIG. 1, when the drive pulse P1 is supplied to the gate of the switch S1 from the drive source 13, the switch S1 repeats an on-off operation. When the drive frequency of the drive pulse P1 is set to a frequency close to the parallel resonance frequency of the inductor L1 and the capacitor the inductor L1 and the capacitor C1 are resonated in parallel, and the voltage at both ends of the resonance circuit 11 fluctuates intensely.

As shown in FIG. 2, when the switch P1 is turned off, the half-wave resonant voltage VS1 is generated at the output end (drain) of the switch P1, and then is returned to voltage zero. At this time, although the switch S1 is off, the current IS1 in the reverse direction flows. The reverse direction current (current of an oblique line part of IS1 of FIG. 2) flows since the diode D1 is turned on, and then the current IS1 decreases and becomes zero. If the drive pulse P1 of the switch S1 is again turned on during this, the current IS1 is smoothly changed from the negative current to the positive current, and flows through the switch S1. This operation is called ZVS (Zero Voltage Switching), and is a switching system in which power loss is very low.

When the half-wave resonant voltage VS1 is generated by the first resonance circuit 11, the series resonance circuit 12 including the second capacitor C2, the second inductor L2 and the power transmission coil T1 is excited and the power is transmitted as radio wave energy to the power receiving coil T2.

On the other hand, in the power receiving device 20, the third resonance circuit 21 including the power receiving coil T2 and the third capacitor C3 is resonated in series and a resonance voltage is generated. The resonance voltage generated in the third resonance circuit 21 is rectified by the rectifying circuit 22 of the diodes D2 and D3 and is smoothed by the capacitor C4, and the direct-current voltage is supplied to the load circuit 23. The load circuit 23 is, for example, a charger to charge an equipment by direct-current voltage. Accordingly, the radio wave energy from the power transmitting device 10 can be effectively received by the power receiving device 20 by using the resonance phenomenon, and the power can be transmitted and received in a non-contact manner.

Since the power transmission apparatus of FIG. 1 is a composite resonance system in which the three resonance circuits mixedly exist, frequency control for load variation is not easy. Then, the embodiment provides a structure in which respective element constants are limited within previously set ranges, and even if the load changes within a range of 0 to ∞, this is acceptable without changing the resonance frequency.

Hereinafter, the constants of the respective elements of the power transmission apparatus of the embodiment will be described. FIG. 3 shows explanatory views for explaining the constants of the respective elements of the power transmission apparatus in the first embodiment (and second embodiment).

(a) in FIG. 3 is a view showing a relation among a drive frequency f0 of the pulse P1 for driving the switch S1 of the power transmitting device 10, a first resonance frequency f1 of the first resonance circuit 11, and a second resonance frequency f2 of the second resonance circuit 12.

That is, when the drive frequency of the switch S1 is f0 (Hz), the resonance frequency (first resonance frequency f1) of the first resonance circuit 11 is determined by the parameters of the inductor L1 and the capacitor C1 and is expressed by expression (1)

Numerical Expression 1

$$f1 = \frac{1}{2\pi\sqrt{L1 \cdot C1}} \quad (1)$$

The first resonance frequency f1 is set to be 1.1 to 1.2 times the drive frequency f0. On the other hand, the resonance frequency f2 of the second resonance circuit 12 is determined by the parameters of the total inductance value of the inductor L2 and the power transmission coil T1, and the capacitor C2, and is expressed by expression (2)

Numerical Expression 2

$$f2 = \frac{1}{2\pi\sqrt{(L2 + T1) \cdot C2}} \quad (2)$$

The second resonance frequency f2 is set to be 0.8 to 0.9 times the drive frequency f0. The reason why the constants of the respective elements are set as described above will be described below.

Figure 4:
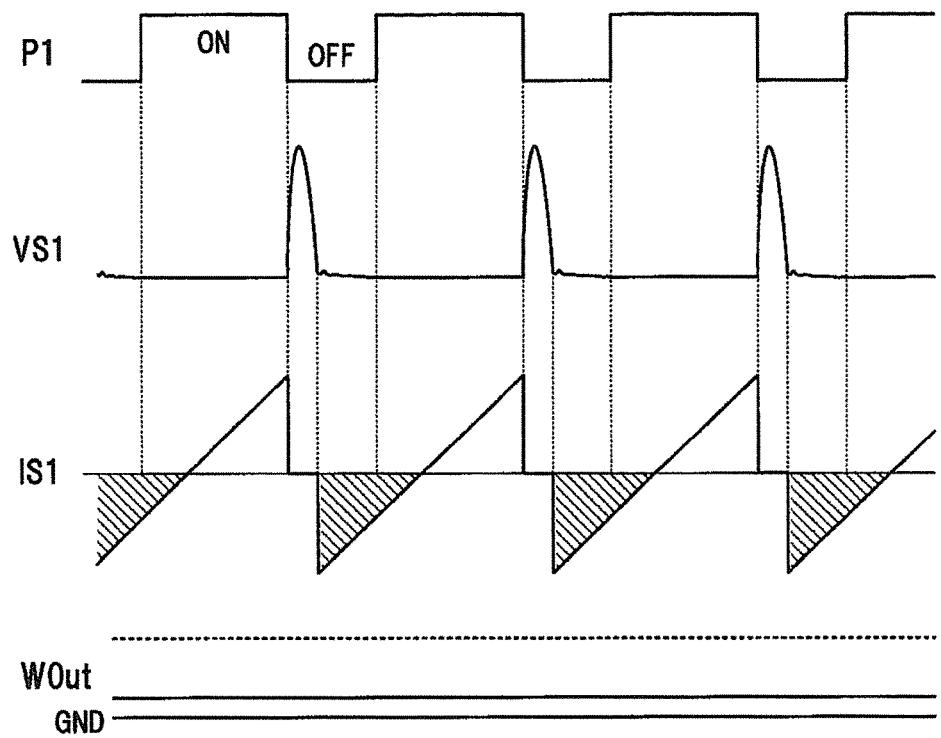
FIG. 4 is a waveform view showing signal waveforms of respective parts when respective resonance frequencies are in a first state.

FIG. 4 is a waveform view showing signal waveforms of the respective parts when the respective resonance frequencies are in a first state, and shows the drive pulse P1 of the switch S1 of the power transmitting device 10, the output voltage VS1 of the switch S1, the current IS1 flowing through the switch S1, and the output voltage (Wout) of the power receiving device 20. The output voltage (Wout) is a voltage applied to the load circuit 23, a solid line indicates an actual measurement value, and a dotted line indicates a target value. If the actually measured value (solid line) is lower than the target value (dotted line), this indicates that the actually measured value does not reach the target value.

In FIG. 4, if the first resonance frequency f1 is set to be higher than 1.2 times the drive frequency f0, the generation section of the half-wave resonance voltage VS1 in one period becomes short as compared with that of VS1 of FIG. 2. The resonance voltage becomes higher than that of FIG. 2 by that.

Besides, after the resonance voltage VS1 rises, the voltage immediately falls zero. Accordingly, the negative current IS1 flows to the switch S1 (the negative current IS1 flows to the diode D1 of the switch S1) from the instant when the resonance voltage VS1 becomes zero. The negative current IS1 is indicated by oblique lines, and the amount of the negative current becomes large as compared with the case of FIG. 2. That is, in FIG. 2, the negative region is small, and the positive region is overwhelmingly large. On the other hand, in the case of FIG. 4, the positive region and the negative region are almost equal to each other, and the negative region increases.

Since the output current is obtained by subtracting the negative region component from the positive region component, when there is little different between the positive and negative components, the output current hardly flows and circulates in the resonance circuit 11. This means that the reactive current which merely circulates in the resonance circuit 11 and does not contribute to the output power increases relative to the actually outputted power. Accordingly, the output power (Wout) becomes low.

Figure 5:
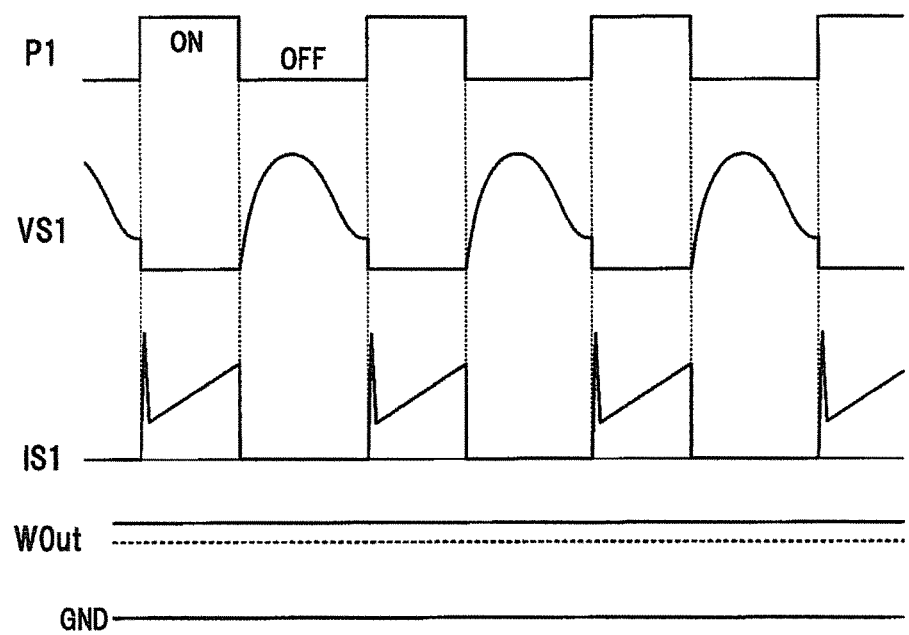
FIG. 5 is a waveform view showing signal waveforms of the respective parts when the respective resonance frequencies are in a second state.

FIG. 5 is a waveform view showing signal waveforms of the respective parts when the respective resonance frequencies are in a second state, and shows the signal waveforms of the respective parts when the first resonance frequency f1 is made lower than 1.1 times the drive frequency f0. If the first resonance frequency f1 is made lower than 1.1 times f0, when the power consumption in the load circuit 23 is low, the same operation as that of FIG. 2 is performed. However, when the power consumption in the load circuit 23 increases, as shown in FIG. 5, before the resonance voltage waveform VS1 becomes zero, the switch S1 shifts to the next on timing.

Then, since the switch S1 is turned on in a state where the electric charge of the capacitor C1 remains, as indicated by the current waveform IS1 of FIG. 5, a current path to short the electric charge of the capacitor C1 occurs, a spike current flows and switching loss suddenly increases. Besides, with respect to the output voltage Wout of the power receiving device 20, although the normal voltage is obtained, since the resonance is defective, the switch S1 generates heat.

Figure 6:
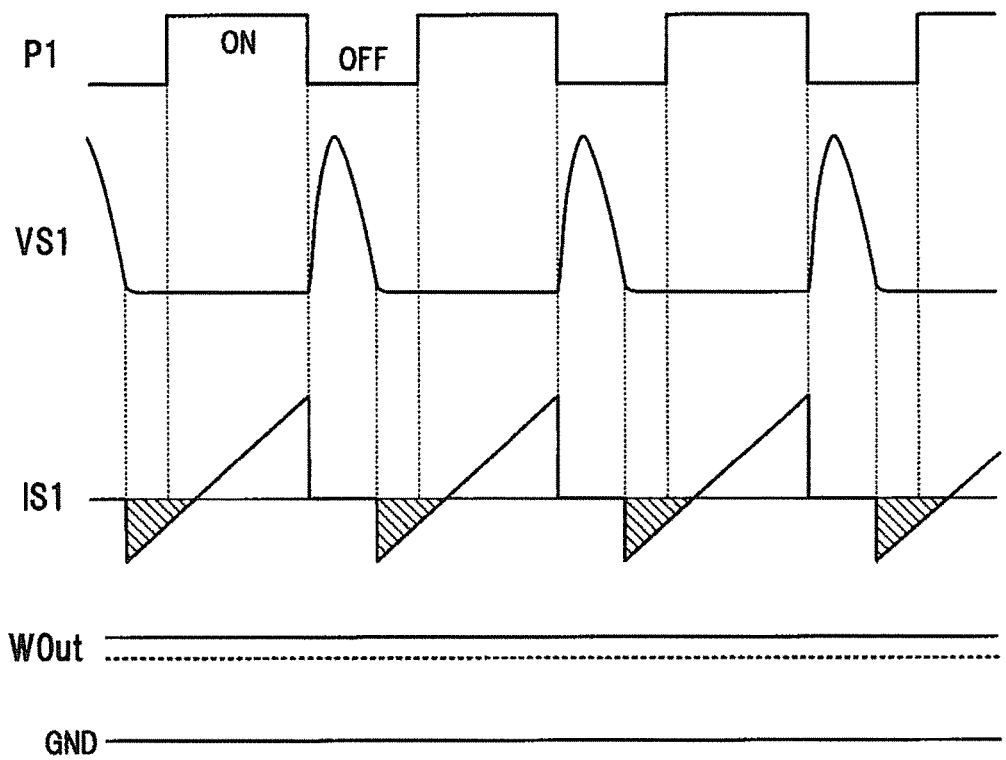
FIG. 6 is a waveform view showing signal waveforms of the respective parts when the respective resonance frequencies are proper.

FIG. 6 is a waveform view showing signal waveforms of the respective parts when the respective resonance frequencies are in a proper state, and showing the signal waveforms of the respective parts when the first resonance frequency f1 is within a range of 1.1 to 1.2 times the drive frequency f0. When the first resonance frequency f1 is set within the range of 1.1 to 1.2 times, the generation section of the half-resonance voltage VS1 in one period becomes slightly longer than VS1 of FIG. 4, and the resonance voltage VS1 rises and falls zero after some delay. The negative current IS1 (current of the oblique line part) flows through the switch S1 from the instant when the resonance voltage VS1 become zero. The negative current IS1 decreases and soon becomes zero. If the drive pulse P1 is again turned on in this duration, the current IS1 smoothly flows from negative to positive and flows through the switch S1.

The amount of the negative current becomes small as compared with the case of FIG. 4, and a difference between the positive region and the negative region becomes large. Accordingly, normal voltage is obtained as the output voltage Wout of the power receiving device 20, and resonance is also properly performed. In FIG. 6, there is sufficient reactive resonance current to reduce the resonance voltage VS1 to the zero level even if power consumption in the load circuit 23 increases. Accordingly, even if load variation occurs, the operation can be performed without changing the resonance frequency or duty.

The reason why the second resonance frequency f2 is set to be lower (0.8 to 0.9 times) than the drive frequency f0 will be described. When the second resonance frequency f2 is made close to the drive frequency f0, resonating occurs and the resonance is intensified. However, the influence of fluctuation of the load circuit 23 is liable to return to the primary side (power transmitting device 10 side), and there is a possibility that off-resonance occurs. Then, in order to reduce the influence, the second resonance frequency f2 is set to be slightly lower than the drive frequency f0. If the frequency is made excessively low, the transmission of output power decreases. Accordingly, the second resonance frequency f2 is set within the range in which the influence of the load circuit 23 is low and the output power can be effectively transmitted, that is, the frequency f2 is set to be 0.8 to 0.9 times f0.

Next, specific circuit design values will be exemplified. For example, when power is transmitted using a radio frequency band of 6.78 MHz, if the frequency is changed, communication disturbances to another wireless equipment occur. Accordingly, the switch S1 is assumed to be driven by the drive pulse P1 with the fixed frequency (6.78 MHz). At this time, if the inductance of the inductor L1 of the first resonance circuit 11 is set to 4.5 µH, and the capacity of the capacitor C1 is set to 100 pF, the resonance frequency f1 becomes 7.5 MHz and is 1.106 times the drive frequency f0, and falls within the range of 1.1 to 1.2 times the drive frequency f0.

If the inductance of the inductor L2 of the second resonance circuit 12 is set to 0.77 µH, the inductance of the power transmission coil T1 is set to 2.1 µH, and the capacity of the capacitor C2 is set to 240 pF, the resonance frequency f2 becomes 6.06 MHz, and falls within the range of 0.8 to 0.9 times the drive frequency f0.

Incidentally, although the example in which the drive frequency is set to 6.78 MHz is described, the drive frequency may be set to another radio frequency band, for example, a double frequency of 13.56 MHz or a GHz band. Besides, the charging of an electric vehicle is assumed, and a structure may be such that large power is transmitted at a low frequency of 50 KHz to 100 KHz.

In the first embodiment, the resonance frequency is not required to be changed in accordance with the load fluctuation, and the resonance state can be kept normal. Accordingly, the first embodiment is effective for power transmission in an equipment using a radio frequency band and the like in which the frequency is fixed. Besides, since the switch S1 is constructed of one piece, reduction in size and weight can be realized by the relatively simple circuit structure and parameter setting. Besides, the use value is high because of the low cost, easy design and the like.

Second Embodiment

Next, a second embodiment will be described with reference to (b) in FIG. 3. In the second embodiment, with respect to the drive frequency f0 of the switch S1 of the power transmitting device 10, the first resonance frequency f1 of the resonance 11 and the second resonance frequency f2 of the resonance circuit 12 are set as shown in (a) in FIG. 3, and further, a third resonance frequency f3 of the resonance circuit 21 of the power receiving device 20 is set as shown in (b) in FIG. 3.

That is, when the drive frequency of the switch S1 is f0, the resonance frequency (first resonance frequency f1) of the resonance circuit 11 is expressed by the expression (1) and is set to be 1.1 to 1.2 times the drive frequency f0. Besides, the resonance frequency (second resonance frequency f2) of the resonance circuit 12 is expressed by the expression (2) and is set to be 0.8 to 0.9 times the drive frequency f0.

Further, the third resonance frequency f3 of the resonance circuit 21 of the power receiving device 20 is determined by parameters of the inductance value of the power receiving coil T2 and the capacitor C3, and is expressed by expression (3).

Numerical Expression 3

$$f3 = \frac{1}{2\pi\sqrt{T2 \cdot C3}} \quad (3)$$

The third resonance frequency f3 is made 0.9 to 1.0 times the drive frequency f0 (f3≠f0). Incidentally, this means that the resonance frequency f3 is set to be closest possible to or slightly lower than the drive frequency f0.

The above setting is required to resonate the third resonance circuit 21 at the power receiving side, which is away from the power transmission side in distance, by causing the resonance frequency f3 to approach the drive frequency f0. If the resonance frequency f3 is 1.0 or more times the drive frequency f0, abnormal resonance occurs. Accordingly, the upper limit is 1.0 times. On the contrary, if the resonance frequency f3 is made 0.9 or less times the drive frequency f0, the degree of resonance suddenly decreases, and power reception is hardly performed. Accordingly, the range of 0.9 to 1.0 satisfies the condition suitable for resonating the resonance circuit 21 at the power receiving side.

Next, a specific design example of the third resonance circuit 21 will be exemplified. For example, when the drive frequency f0 of the switch S1 is 6.78 MHz, if the inductance of the power receiving coil T2 is made 1.93 μH, and the capacity of the capacitor C3 is made 300 pF, the third resonance frequency f3 is 6.61 MHz and is 0.975 times the drive frequency f0. This falls within the condition range of 0.9 to 1.0 times.

For example, in FIG. 4 (when the first resonance frequency f1 is higher than 1.2 times the drive frequency f0), if the third resonance frequency f3 is made lower than 0.9 times the drive frequency f0, the degree of resonance decreases, the output voltage Wout decreases, and the power is not transmitted to the power receiving device 20 side.

Besides, in FIG. 5 (when the first resonance frequency f1 is lower than 1.1 times the drive frequency f0), if the third resonance frequency f3 is made higher than 1.0 times the drive frequency f0, although the output voltage Wout is normal, the switch S1 generates heat.

Besides, in FIG. 6 (when the first resonance frequency f1 is in the range of 1.1 to 1.2 times the drive frequency f0), if the third resonance frequency f3 is made 0.9 to 1.0 times the drive frequency f0, the output voltage Wout is normal, and the heat generation of the switch S1 is also suppressed.

As described above, in the second embodiment, the third resonance frequency f3 is set to be 0.9 to 1.0 times the drive frequency f0, so that the power can be efficiently transmitted to the power receiving side. Besides, even if the load significantly fluctuates, normal resonance can be kept without changing the resonance frequency. Especially, when the resonance frequency is made close to the 0.9 times side, although the output power is slightly reduced, tolerance to the load fluctuation becomes very high. For example, even if the resistance value of the load is in the range of 0 to ∞, the normal resonance can be kept without changing the resonance frequency.

That the resistance value of the load is 0 means a state in which when the load circuit 23 is, for example, a charger, both ends of the charger is shorted, and an iron plate or the like is put. Besides, that the resistance value of the load is ∞ means a state in which nothing is put on the charger. Since the manner of use of an actual product is not known, the resistance value of the load is assumed to be changed in the range of 0 to ∞, and the normal resonance is made to be capable of being kept.

Incidentally, in FIG. 1, although the example in which the MOSFET is used as the semiconductor switch S1 is described, no limitation is made to this. For example, the semiconductor switch may be a bipolar transistor, an IGBT (Insulated Gate Bipolar Transistor), or a semiconductor switch of GaN (gallium nitride), SiC (silicon carbide) or the like. Alternatively, the semiconductor may not be used, and the switch may be a switch element made of a combination of a mechanical relay and a half-wave rectifying diode. Besides, the circuit structure is not limited to the structure of FIG. 1, and any circuit may be used as long as the same function is obtained.

Figure 7:
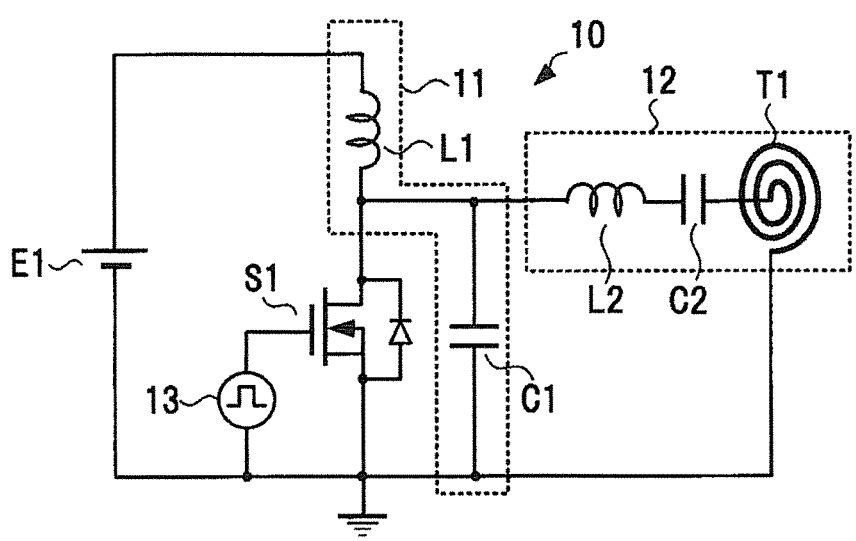
FIG. 7 is a circuit view showing a modified example of the power transmitting device in the embodiment.

FIG. 7 is a circuit view showing a modified example of the power transmitting device 10, in which in a parallel resonance circuit 11 including a first inductor L1 and a first capacitor C1, the first capacitor C1 is connected in parallel to a switch S1. A resonance voltage is obtained from a connection point between the first inductor L1 and the first capacitor C1, and is supplied to a second resonance circuit 12. The basic operation of FIG. 7 is identical to that of FIG. 1. The other end of a power transmission coil T1 may be connected not to the reference potential point side of a direct-current power supply E1 but to the power feed end (positive electrode terminal) side.

Figure 8:
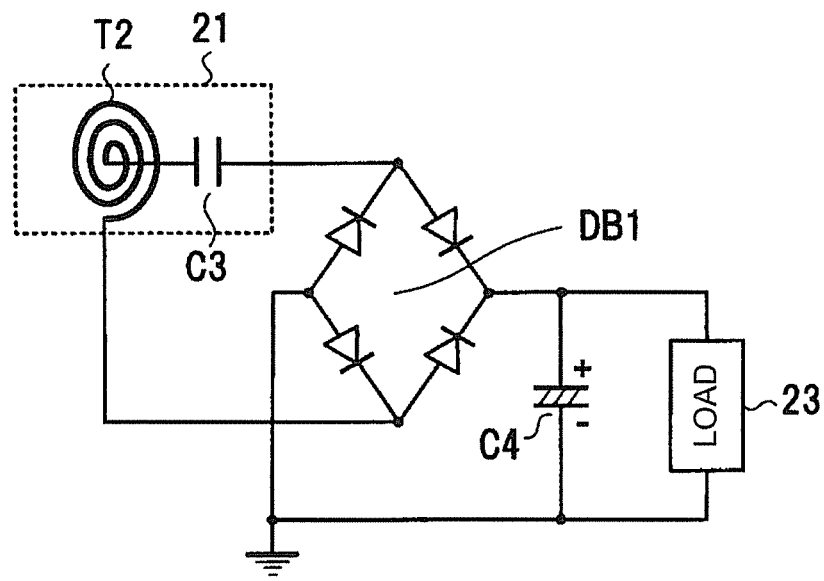
FIG. 8 is a circuit view showing a modified example of a power receiving device in the embodiment.
Figure 9:
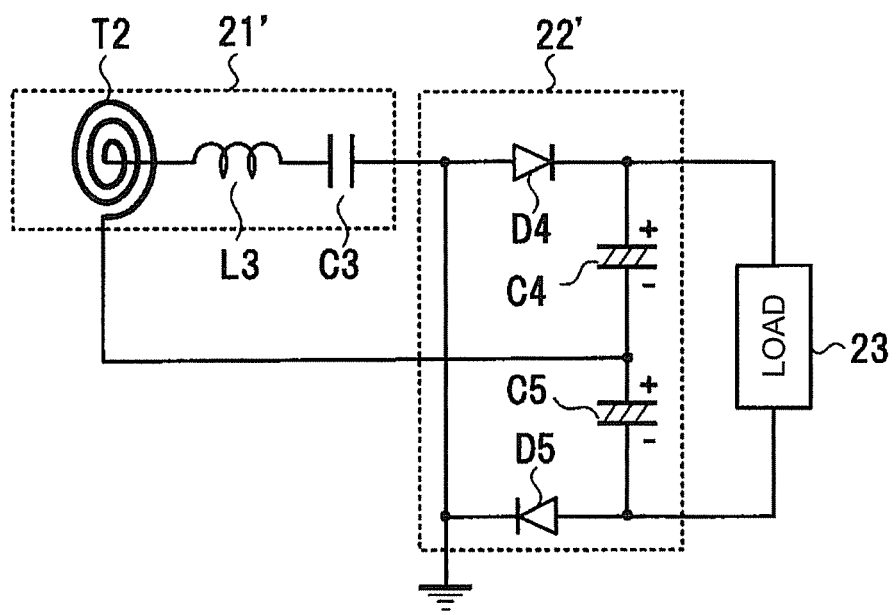
FIG. 9 is a circuit view showing another modified example of the power receiving device in the embodiment.

FIG. 8 and FIG. 9 are circuit views showing modified examples of the power receiving device 20. FIG. 8 is an example in which a full-wave rectifying circuit DB1 is used as a rectifying method. A resonance voltage generated in a third resonance circuit 21 is rectified by the full-wave rectifying circuit DB1, and a direct-current voltage smoothed by a capacitor C4 is supplied to a load circuit 23.

FIG. 9 is an example in which when the inductance value of a power receiving coil T2 is small, a third inductor L3 is inserted. In the power receiving device 20, a third resonance circuit 21' including the power receiving coil T2, the third inductor L3 and a third capacitor C3 performs series resonance and generates a resonance voltage. Besides, a double-voltage rectifying circuit 22' using fourth and fifth diodes D4 and D5, and fourth and fifth capacitors C4 and C5 is used as another mode of rectification. The resonance voltage generated in the third resonance circuit 21' is rectified and smoothed by the double-voltage rectifying circuit 22', and the direct-current voltage is supplied to a load circuit 23.

Also in the modified examples as described above, the non-contact power transmission apparatus can be constructed of the simple circuit structure, and the power can be transmitted with a small number of parts, at low cost and very efficiently.

According to the embodiments described above, miniaturization can be achieved by the relatively simple circuit structure, the stable power transmission can be performed by the simple setting of the element parameters, and the use value is high because of the low cost and easy designing. Besides, even if the distance between the power transmitting side and the power receiving side is changed or the load is changed, the resonance state can be kept normal without changing the resonance frequency, and specified power can be transmitted. Accordingly, the embodiments are effective in use in the radio frequency band. Besides, the magnetic field resonance system is adopted which uses the resonance by the resonance system of the power transmission coil and the resonance system of the power receiving coil. Thus, the positional relation between the power transmission coil T1 and the power receiving coil T2 is relatively free, and power receiving can be performed even at a relatively distant place. Accordingly, the use value is high for an electric vehicle or the like in which the positions of the power transmission coil and the power receiving coil change according to the vehicle model or for a case where the load changes according to the charge state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power transmission apparatus for transmitting power from a power transmitting device to a power receiving device in a non-contact manner, wherein
the power transmitting device comprises:
a series circuit which is connected between a direct-current power source and a reference potential point, and includes a parallel resonance circuit including a first capacitor and a first inductor, and a switch element including a parasitic diode in parallel to a main current path;
a drive source to drive on or off the switch element; and
a first series resonance circuit which is connected to a connection point between the parallel resonance circuit and the switch element and includes a second inductor, a second capacitor and a power transmission coil, and
the power receiving device comprises:
a second series resonance circuit including a power receiving coil paired with the power transmission coil, and a third capacitor connected in series to the power receiving coil; and
a rectifying circuit to rectify a voltage generated in the second series resonance circuit and to supply the voltage to a load circuit.

2. The apparatus according to claim 1, wherein a resonance frequency f1 of the parallel resonance circuit is set to be 1.1 to 1.2 times a drive frequency f0 of the switch element, and a resonance frequency f2 of the first series resonance circuit is set to be 0.8 to 0.9 times f0.

3. The apparatus according to claim 1, wherein a resonance frequency f3 of the second series resonance circuit is set in a range of 0.9 to 1.0 (f3 ≠ f0) of a drive frequency f0 of the switch element.

4. A power transmitting device for transmitting power to a power receiving device in a non-contact manner, comprising:
a series circuit which is connected between a direct-current power source and a reference potential point, and includes a parallel resonance circuit including a first capacitor and a first inductor, and a switch element including a parasitic diode in parallel to a main current path;
a drive source to drive on or off the switch element; and
a first series resonance circuit which is connected to a connection point between the parallel resonance circuit and the switch element and includes a second inductor, a second capacitor and a power transmission coil.

5. The apparatus according to claim 1, wherein the parallel resonance circuit of the power transmitting device includes:
the first inductor and the first capacitor connected in parallel between the direct-current power source and an output end of the switch element.

6. The apparatus according to claim 1, wherein the parallel resonance circuit of the power transmitting device includes:
the first inductor connected between the direct-current power source and an output end of the switch element, and the first capacitor connected between the output end of the switch element and the reference potential point.

7. The apparatus according to claim 4, wherein a resonance frequency f1 of the parallel resonance circuit is set to be 1.1 to 1.2 times a drive frequency f0 of the switch element, and a resonance frequency f2 of the first series resonance circuit is set to be 0.8 to 0.9 times f0.

8. The apparatus according to claim 4, wherein the parallel resonance circuit includes:
the first inductor and the first capacitor connected in parallel between the direct-current power source and an output end of the switch element.

9. The apparatus according to claim 4, wherein the parallel resonance circuit includes:
the first inductor connected between the direct-current power source and an output end of the switch element, and the first capacitor connected between the output end of the switch element and the reference potential point.

* * * * *